(12) United States Patent
Chen et al.

(10) Patent No.: US 6,239,900 B1
(45) Date of Patent: May 29, 2001

(54) REFLECTIVE FIBER-OPTIC ISOLATOR

(75) Inventors: Qiushui Chen, Medford; Run Zhang, Bedford; Paul Melman, Newton, all of MA (US)

(73) Assignee: NZ Applied Technologies Corp., Woburn, MA (US)

( * ) Notice: Subject to any disclaimer, the term of this patent is extended or adjusted under 35 U.S.C. 154(b) by 0 days.

(21) Appl. No.: 09/397,615

(22) Filed: Sep. 16, 1999

Related U.S. Application Data (63) Continuation-in-part of application No. 09/156,712, filed on Sep. 18, 1998, now abandoned.
(60) Provisional application No. 60/080,779, filed on Apr. 6, 1998, and provisional application No. 60/059,540, filed on Sep. 19, 1997.

(51) Int. Cl.[7] .............................. G02B 5/30; G02B 27/28; G02F 1/09
(52) U.S. Cl. .......................... 359/282; 359/484; 359/487; 359/495; 359/497; 372/703; 385/11; 385/34
(58) Field of Search .................................. 359/281, 282, 359/484, 487, 495, 497; 372/703; 385/11, 18, 27, 31, 34

(56) References Cited

U.S. PATENT DOCUMENTS

| Re. 35,575 | 7/1997 | Pan .......................................... 385/11 |
|---|---|---|
| 4,239,329 | 12/1980 | Matsumoto ........................ 350/96.15 |
| 4,548,478 | 10/1985 | Shirasaki .............................. 350/377 |
| 4,712,880 | 12/1987 | Shirasaki .............................. 350/377 |
| 4,974,944 | 12/1990 | Chang .................................... 350/377 |
| 4,988,170 | 1/1991 | Buhrer .................................. 350/377 |
| 5,033,830 | 7/1991 | Jameson ................................ 350/403 |
| 5,151,955 | 9/1992 | Ohta ........................................ 385/6 |
| 5,191,467 | 3/1993 | Kapany et al. ...................... 359/341 |
| 5,204,868 | 4/1993 | Konno et al. .......................... 372/34 |
| 5,208,876 | 5/1993 | Pan .......................................... 385/11 |
| 5,262,892 | 11/1993 | Nakamura ............................. 359/484 |
| 5,299,056 | 3/1994 | Kurata et al. ........................ 359/341 |
| 5,428,477 | 6/1995 | Siroki .................................... 359/484 |
| 5,446,578 | 8/1995 | Chang et al. ........................ 359/282 |
| 5,446,813 | 8/1995 | Lee et al. ................................ 385/31 |
| 5,471,340 | 11/1995 | Cheng et al. ........................ 359/281 |
| 5,493,440 | 2/1996 | Souda et al. .......................... 359/341 |
| 5,499,132 | 3/1996 | Tojo et al. ............................ 359/281 |

(List continued on next page.)

Primary Examiner—Ricky D. Shafer
(74) Attorney, Agent, or Firm—Hamilton, Brook, Smith & Reynolds, P.C.

(57) ABSTRACT

In a device having a fiber-optic cables, one that is normally an input and one that is normally an out output for light transmission through the device, a first polarization sensitive deflector encompassing the normal input beam and a second polarization sensitive deflector encompassing the normal output beam is followed by a polarization interchanger that interchanges the polarization of beams traveling from the input to the output and leaves unchanged the polarization of beams traveling from the output to the input. This is, in turn, followed by a third polarization sensitive deflector encompassing the input beam and a fourth polarization sensitive deflector encompassing the output beam. Lastly, a lens having a reflector on the side opposite the input and output fibers reflects light beams from the input to the output and conversely. The deflectors encompassing the input beam are arranged to produce a deflection in one direction and the deflectors encompassing the output beam produce a deflection in another direction at least at a 45° angle to the direction of the deflectors encmpassing the input beam. When light travels backwards from the normal output cable to the input cable, the two-dimensional deflections reduce the light that reach the input cable due to imperfections in the optical components, but the deflectors and interchangers are still arranged to maximize the transmission from the normal input to the output cable.

18 Claims, 7 Drawing Sheets

U.S. PATENT DOCUMENTS

| | | | |
|---|---|---|---|
| 5,546,219 | 8/1996 | Iida et al. | 359/281 |
| 5,557,692 | 9/1996 | Pan et al. | 385/11 |
| 5,566,259 | 10/1996 | Pan et al. | 385/11 |
| 5,574,595 | 11/1996 | Kurata et al. | 359/484 |
| 5,574,596 | 11/1996 | Cheng | 359/484 |
| 5,581,640 | 12/1996 | Pan | 385/11 |
| 5,588,078 | 12/1996 | Cheng et al. | 385/33 |
| 5,661,829 | 8/1997 | Zheng | 385/33 |
| 5,689,359 | 11/1997 | Kurata et al. | 359/281 |
| 5,689,360 | 11/1997 | Kurata et al. | 359/281 |
| 5,689,593 | 11/1997 | Pan et al. | 385/11 |
| 5,706,371 | 1/1998 | Pan | 385/11 |
| 5,726,801 | 3/1998 | Pan | 359/484 |
| 5,729,377 | 3/1998 | Bergmann | 359/249 |
| 5,737,349 | 4/1998 | Gaebe | 372/37 |
| 5,757,538 | 5/1998 | Siroki | 359/282 |
| 5,768,005 | 6/1998 | Cheng et al. | 359/281 |
| 5,768,015 | 6/1998 | Pattie | 359/484 |
| 5,774,264 | 6/1998 | Konno et al. | 359/497 |
| 5,825,950 | 10/1998 | Cheng | 385/27 |
| 5,835,270 | 11/1998 | Urino et al. | 359/484 |
| 5,848,203 | 12/1998 | Kawakami et al. | 385/11 |
| 5,912,766 | 6/1999 | Pattie | 359/484 |
| 5,930,418 * | 7/1999 | Chang . | |
| 5,930,422 * | 7/1999 | Cheng . | |

* cited by examiner

REFLECTIVE FIBER-OPTIC ISOLATOR

RELATED APPLICATIONS

This application is a CIP of application 09/156,712, filed Sep. 18, 1998, now abandoned which claims priority from two U.S. provisional applications with serial No. 60/059,540, filed Sep. 19, 1997, and 60/080,779, filed Apr. 6, 1998.

STATEMENT OF GOVERNMENTAL INTEREST

This invention was made with Government support under contract number F30602-97-C0090 awarded by the Department of the Air Force. The Government has certain rights in this invention.

BACKGROUND OF THE INVENTION

1. Technical Field

The invention relates to an optical isolator for use with fiber-optic cables and, more particularly, to a polarization independent optical isolator having cables on one sides only and using a reflector to produce two stages of isolation.

2. Background

It is well known in the art that a polarization independent optical isolator is an essential device for optical fiber communication systems that use laser sources. An optical isolator is an optical component that transmits an optical signal in a forward direction and blocks (isolates) it from transmitting in a backward direction. In telecommunications systems, the input and output to the device are provided by fiber-optic cables that interface with other devices. Backward reflections from devices to which the output cable connects creates the need to isolate these reflections from devices to which the input cable connects.

There are two physical configurations. In an in-line configuration, the input and output cables are on opposite sides and light passes through the isolator from one end to the other. In a single-sided configuration, the input and output cables are on the same side. Generally, a reflective element is opposite the cables directing light from one to the other through the isolator. Single-sided configurations are preferred in some installations where there are a large number of isolators and other devices. It is easier to locate the fiber-optic cables if they enter and leave from the same side. In still other applications, the reflective element can be designed to allow a small amount of the light going though isolator to be tapped off to monitor the light intensity.

Isolators should have a number of desirable characteristics. The transmission from the input cable to the output should be as high as possible, i.e., the insertion loss should be low. The transmission from the output cable to the input should be as low as possible, i.e., the isolation should be high. The light in the input cables may be randomly polarized and it is necessary that the isolator produces the same low insertion and high isolation independent of polarization. Also, whatever the polarization in the input cable, an isolator usually resolves the light into two orthogonal polarizations in the first element. In order to prevent short pulses from being broadened, it is desirable to maintain the same phase relationship between these two polarizations in the output cable, i.e., there should be no dispersion between the phases of the two polarizations.

Commercial devices are preferably compact, inexpensive, and easy to put together and align. For instance, a number of isolators use wedged shaped optical elements. A design using flat plates should be more convenient to manufacture and assemble. One of the problems in making isolators is that a high degree of isolation requires precision alignment. Even with precision alignment, the optical properties of some of the components are a function of wavelength and temperature so that isolator performance degrades for wavelengths and temperatures away from the ones used for the design.

In some applications an isolation of 60 dB (one part per million) is desired. This is almost impossible to achieve with a single isolator and the usual solution is to cascade isolators in a series of stages. On stage is a complete isolator in itself and this feeds a second complete isolator. Using an in-line configuration, in principle, this is straightforward. For example, the output cable of an isolator with an isolation of 30 dB can be used as the input of cable of a second isolator to yield 60 dB of isolation. Usually, however, two stage in-line isolators do not use separate cables to connect the two stages, but put them together in one package. Making in-line isolators is eased somewhat because the light beams are aligned along one axis. Two stage in-line isolators with 55 dB of isolation are commercially available.

In spite of being preferable in some applications, single-sided isolators are less common. There does not seem to be any commercially available two-stage single-sided isolators, at least ones with greater than 35 dB of isolation. This may be because single-sided isolators are harder to make. One challenge with all two-stage isolators is to provide two stages of isolation for even spurious light beams due to imperfect optical components and alignment. Although the optical isolator field is very crowded with many designs using the same or similar components in a variety of configurations, a practical two-stage single-sided isolator is not yet available.

SUMMARY OF THE INVENTION

It is an object of the present invention to improve isolation performance of single-sided fiber-optic cable, polarization-independent optical isolators at reduced cost. High isolation and tolerance of optical component imperfections is realized by a dual stage design wherein each stage produces deflections in different directions. Low dispersion is realized by providing equal path lengths for all polarizations. Low cost is achieved by using a reflector to make two passes through the same components and the use of flat plates for all elements resulting in easier manufacturing and assembly.

In a device having a fiber-optic cables, one that is normally an input and one that is normally an output for light transmission through the device, these objectives are achieved by having a first polarization sensitive deflector encompassing the normal input beam and a second polarization sensitive deflector encompassing the normal output beam, both next to the cables, followed by a polarization interchanger that interchanges the polarization of beams traveling from the input to the output and leaves unchanged the polarization of beams traveling from the output to the input. This is, in turn, followed by a third polarization sensitive deflector encompassing the input beam and a fourth polarization sensitive deflector encompassing the output beam. Lastly, a lens having a reflector on the side opposite the input and output fibers reflects light beams from the input to the output and conversely. The deflectors encompassing the input beam are arranged to produce a deflection in one direction and the deflectors encompassing the output beam produce a deflection in another direction at least at a 45° angle to the direction of the deflectors encompassing the input beam.

When light travels backwards from the normal output cable to the input cable, the two-dimensional deflections reduce the light that reach the input cable due to imperfections in the optical components, but the deflectors and interchangers are still arranged to maximize the transmission from the normal input to the output cable.

A partially transmitting reflector may be used in order to monitor the light in the beams with a photodetector.

BRIEF DESCRIPTION OF THE DRAWINGS

FIG. 1b shows the end views of polarization directions corresponding to optical rays in the sections of A—A', B—B', C—C', D—D', and E—E'of FIG. 1a.

FIG. 2b shows the end views of polarization directions corresponding to optical rays in the sections of A—A', B—B', C—C', D-D', and E—E' of FIG. 2a.

DETAILED DESCRIPTION OF THE INVENTION

Figure 1A:
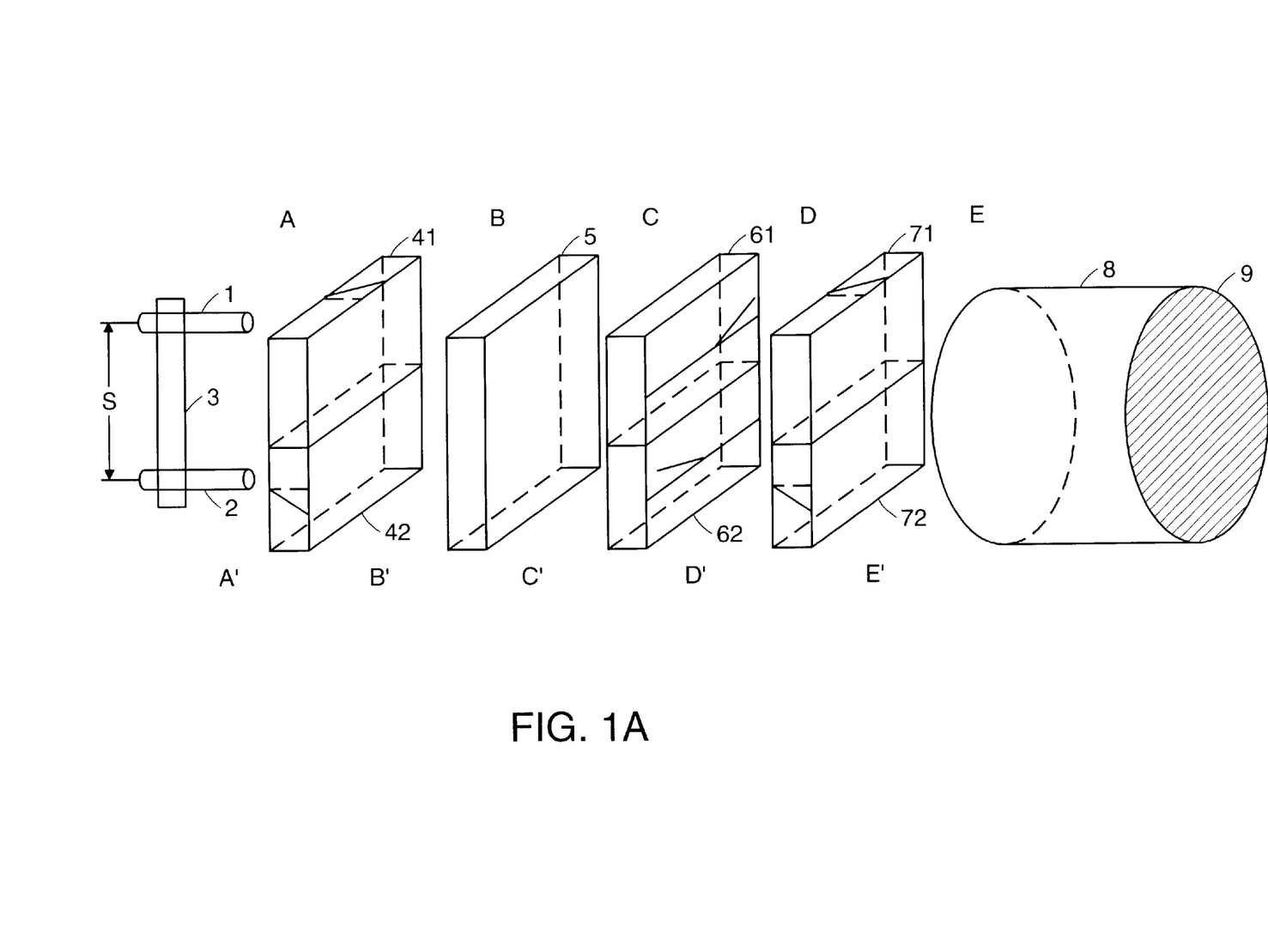
FIG. 1a is a perspective view of a first embodiment of an optical isolator according to the present invention. The light from a first fiber is transmitted to a second fiber in a forward direction.
Figure 1B:
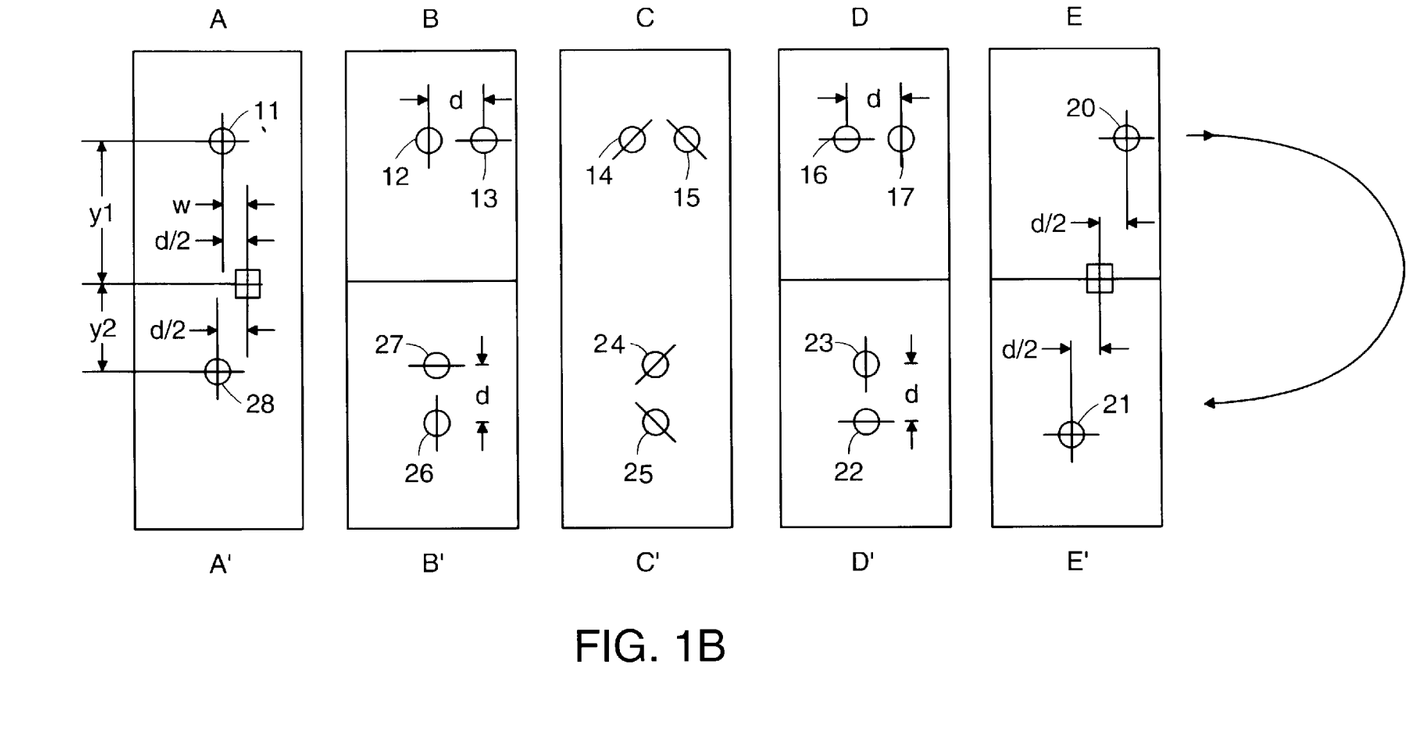
Figure 1C:
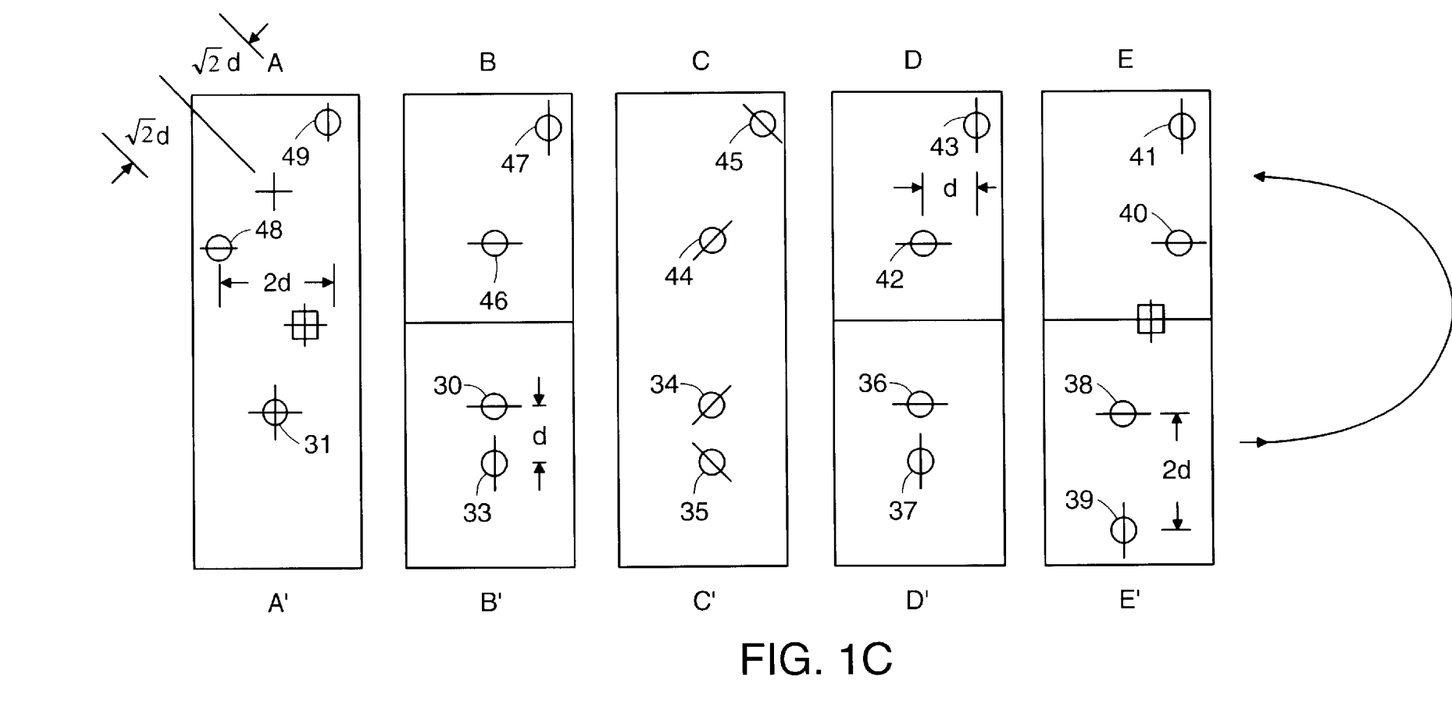
FIG. 1c corresponds to FIG. 1b and illustrates isolation. The light from the second fiber is not transmitted to the first fiber in the backward direction.

The structure of one embodiment of the invention is illustrated in FIG. 1a. It includes two single-mode optical fibers 1 and 2, an optical fiber mounting block 3, a first pair of birefringent plates 41 and 42, a second pair of birefringent plates 71 and 72, a magneto-optic plate 5 (i.e., a Faraday rotator), a pair of half-wave plates 61 and 62, and a GRIN lens 8 with a reflective surface 9. The optical isolator is used to transmit light from fiber 1 to fiber 2, and to block light from fiber 2 to fiber 1. FIG. 1b shows the polarization direction and the position of each polarized beam after passing through each element of the structure as viewed looking into the beam from the right side in the figure. FIG. 1c shows the same as FIG. 1b for light transmitted from fiber 2 to fiber 1.

Explanation of the invention requires reference to various orientation angles. Three reference planes can be used. The plane containing the coplanar fibers, also the plane of the paper, is the first. The second is a plane perpendicular to the fiber plane and oriented parallel to the fibers so that it is longitudinal to them. The third is a plane perpendicular to the first two so that it is transverse to the fibers. The terms fiber plane, longitudinal plane, and transverse plane will be used. The central rays of light beams do not all travel in the fiber plane and it is difficult to illustrate the paths through the optical elements. FIGS. 1b and 1c do illustrate where the beams end up after traversing the optical elements.

Generally, the light from an optical fiber is not collimated. For case of understanding, the figures show the path of a central ray emerging with no divergence illustrated. The effects of divergent beams and imperfect components can be better understood after explanation of the principles of operation in an ideal situation.

First, the light from fiber 1 enters the birefringent plate 41 as shown with two polarizations in panel A of FIG. 1b. This plate, and also the birefringent plate 71, are oriented with their optical c-axes parallel to the longitudinal plane, but at a 45° angle to fiber and transverse planes. The birefringent plate 41 separates the incident light into a pair of linearly polarized rays (with whatever arbitrary intensities were contained in the incident beam), the ordinary ray 12 and the extraordinary ray 13. These have mutually perpendicular polarization planes as illustrated in panel (B) in FIG. 1b. (Hereinafter, a letter within a parenthesis is meant to direct the reader to that particular panel.) Within the birefringent plate 41, the ordinary ray advances in the longitudinal plane while the extraordinary ray is propagated at an angle termed the "walk-off" angle. After passing through the birefringent plate 41 , these two rays are separated spatially in the longitudinal plane by an amount, d, termed the "walk-off" distance. The separation is determined by the birefringence of the material, $(n_e-n_o)$, the orientation of the optical axis and the thickness of the plate. For single-mode optical fibers with a 10 $\mu$m core, d=50 to 100 $\mu$m is usually adequate for isolation purposes.

The magneto-optic plate 5 irreversibly rotates the polarization angle of incident light as illustrated in panel C. As shown by rays 14 and 15, the polarization directions of both incident rays 12 and 13 are rotated by 45° counterclockwise (C).

A half-wave plate 61 is used to further rotate the plane of polarization of incident light. As shown in FIG. 1a, the optical axis of half-wave plate 61 is in the transverse plane oriented at 22.5° counterclockwise from the longitudinal plane. A general property of a half-wave plate is that polarization directions are reflected about its optical axis. Thus, ray 14 with a direction 22.5° counterclockwise from the optical axis is reflected to 22.5° clockwise (a net rotation of 45° clockwise) which is in the longitudinal plane. Ray 15 with a direction 67.5° counterclockwise from the optical axis is reflected to 67.5° counterclockwise (a net rotation of 135° counterclockwise) which is in the longitudinal fiber plane (D). Therefore, the directions of polarization planes of the rays 16 and 17 have been interchanged with that of rays 12 and 13, respectively.

The birefringent plate 71 is identical to birefringent plate 41. Its optical axis is also in the longitudinal plane, oriented at 45° to the transverse and fiber planes, and has the same thickness. As a result, with the interchange of polarization states, ray 16 will be deflected toward ray 17 and the two will recombine in plate 7 as they emerge as ray 20 (E) a distance d in the longitudinal plane from the input fiber 1.

A GRIN lens 8 having a reflector 9 at its opposite end, as shown in FIG. 1a, reflects ray 20 back as ray 21. This emerges at a point equidistant from the lens axis, illustrated by the square with cross-hairs, as the entry point (termed "conjugate points") for entering the second stage of the isolator (E'). The advantages of using a GRIN lens for reflection include ease of assembly for imaging of the input fiber to the output fiber.

The elements in the second stage of the isolator are arranged to produce walk-offs at approximately 90° to the first stage, namely, in the fiber plane as opposed to the longitudinal plane. Birefringent plates 72 and 42 have their c-axis in the fiber plane at 45° to the longitudinal and transverse planes, as illustrated in the bottom part of FIG. 1a. The optical axis of the half-wave plate 62, while being in the transverse plane, is oriented 22.5° clockwise from the longitudinal plane. The effect of each of the elements on the light is similar to that in the first pass, as illustrated in FIG. 1b. After traversing plate 72, ray 23 is deflected a distance d in the fiber plane (D'). The half-wave plate 62 rotates the two polarizations by 45° counterclockwise (C'). Note, however, that the rotator 5 rotates the polarization angle 45° counterclockwise irrespective of the propagation direction (B'). The net result is that, the polarizations are interchanged and the undeflected ray 26 is walked-off a distance d and the rays recombine to form ray 28 (A').

In order to enter fiber 2, it must be a specific distance from the longitudinal plane. The GRIN lens 8 and reflector 9 reflect the ray 20 to the conjugate point, to become ray 21. Thus, if the fiber 1 distance y1 from the longitudinal, the distance y2 for fiber 2 is given by y2=y1−d. Any of a number of well known fixtures could be used to provide the registration of the two fibers. One very convenient method will be described below.

FIGs. 1c illustrate the effects of the isolator on a light beam entering from fiber 2. The first stage will split it into two spatially separated rays in one direction that do not recombine and the second stage will further separated the rays in an orthogonal direction. In more detail, the first stage acts as follows. The arbitrarily polarized light 31 emerging from the optical fiber 2 will be split in the birefringent plate 42 into an ordinary ray 32 that passes straight through and an extraordinary ray 33 that is deflected by an amount d (B'). The magneto-optic plate 5 rotates their polarization planes by 45° in a counterclockwise direction (C'). The half-wave plate 62 rotates the polarization direction of the ordinary ray 34 by a further 135° counterclockwise, so that the polarization plane of ray 36 is parallel to the longitudinal plane, and ray 35 by 45° clockwise, so that the polarization plane of ray 37 is parallel to the fiber plane (D').

With respect to the birefringent plate 7, ray 36 is still an ordinary ray even though its direction of polarization is rotated by 180°. Thus, it travels through the plate without deflection. The polarization angle of ray 37 still leaves it an extraordinary ray and it is deflected by an additional amount d (E'). After reflection, in the second stage, the process repeats as shown in upper part of FIG. 1c. In this stage, however, the deflections are in the longitudinal plane as opposed to the fiber plane. The ordinary ray travels straight through while the extraordinary ray is deflected in the longitudinal plane by 2d. Both rays miss the input fiber 1 by √2d.

The polarization of any input beam can be analyzed as two polarizations with planes parallel to the fiber and longitudinal planes. Since the principle of operation did not depend on the magnitude of such polarizations, the isolation is insensitive to polarization.

The foregoing explained an ideal situation in which the entering light was perpendicular to the various plates, the materials were homogenous, and the plates were of a precise thickness and oriented exactly. Each deviation from the ideal contributes to less than perfect isolation. In general, this is extremely complicated to analyze.

A major deviation from the ideal is that the spot diameter of the usual single mode fiber for communication is 10 μm, but the light from this point-like core is divergent at an angle of several degrees (about 6° for an N.A.=0.1 fiber). Because performances of the birefringent plates, half-wave plates and the magneto-optic plate are direction-dependent, a collimated beam is preferable. However, the inventors calculated that, if the divergence angles are less than 5°, the isolation degradation due to the divergent incident angle from fiber 2 is less than 2 dB for a single-stage isolator with an initial isolation of 35 dB. This is a worst case since, usually, most of the energy in the beam will be contained within small divergence angles. With increased expense and size, one easy solution is to use additional collimating lenses between the elements.

The birefringent plates can be made of a birefringent material such as rutile, calcite, yttrium orthovanadate (YVO4), or lithium niobate. For example, plates made from YVO4 ($n_e-n_o$=0.2 at a wavelength of 1.550 μm) with an optical axis at 45° to the propagation direction and a thickness of 0.5 mm will produce a walk-off distance of about 50 μm. If this is not sufficient, 1.0 mm plates could be used to double the walk-off at the expense of increased absorption.

Commonly, Faraday rotators have used external solenoid electromagnets wound around the isolator to provide the required internal magnetic field. Currently, however, permanently polled Faraday rotators are available in which no external magnet is required. One example is the "Latching" Faraday rotator from Lucent Technologies' Bell Laboratories in Murray Hill, N.J.

In all embodiments, the length of the GRIN lens 8 should be shortened by an amount equal to the optical path length in the various plates.

Ideally, all walk-offs are the same. Less restrictively, in order for the beams to precisely recombine, the walk-offs of plates 41 and 71 and, separately, the walk-offs for plates 42 and 72 should be equal, preferably within less than 1 um for a less than 0.25 dB loss. Advantageously, if the plates are in thermal contact, the effects of temperature changes on walk-off will be the same for both polarizations and the loss should remain small.

The polarization dispersion is potentially zero since, assuming ideal components, each polarization travels the same distance. Again, separate matches between plates 41 and 71 and 42 and 72 are sufficient. Although not illustrated, the polarization state of the beam in fiber 2 is the same as it was in fiber 1. Here too, the effect of temperature changes on optical thickness will be the same leading to maintenance of low polarization mode dispersion.

Several modifications can be made that will yield equivalent results. The plates 61 or 62 can individually have their c-axis rotated by 90°. The position of plate 5 and plates 61 and 62 can be interchanged if the c-axis of both plates 61 and 62 are rotated by 45° or 135°. The half-wave plates 61 and 62 can be any odd multiple of a half-wave.

Figure 1D:
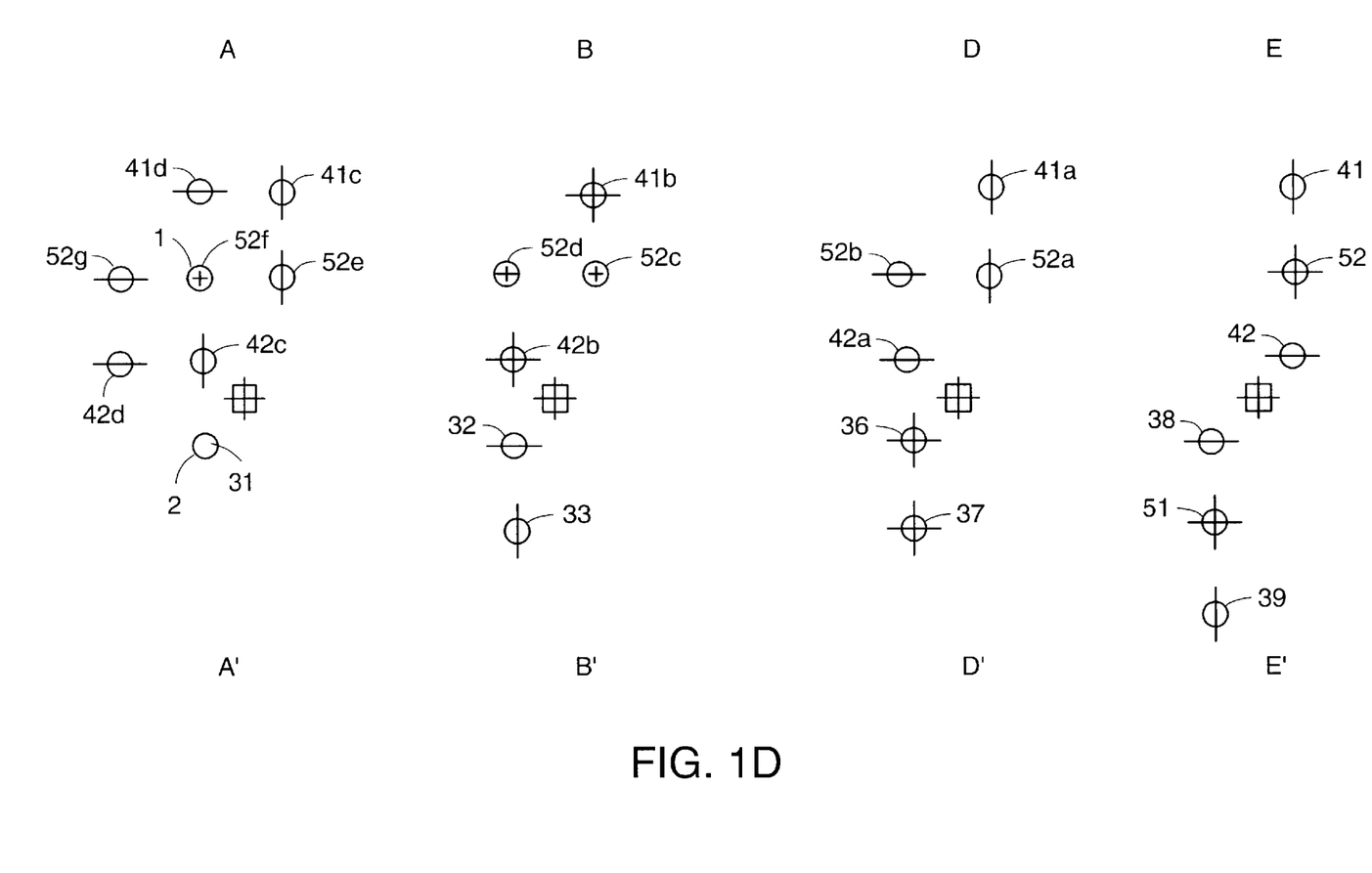
FIG. 1d corresponds to FIG. 1c and shows the end views of polarization directions corresponding to optical rays, excluding section C—C', of FIG. 1c, but including spurious rays due to imperfect optical components.

The effect of deviations from ideal in the c-axis orientations of the half-wave plate or the Faraday rotator is to under or over rotate the polarization direction. So, for example, if the half-wave plate and rotator were configured to produce a polarization rotation to 0°, but a rotation to 1° were produced, the beam could be resolved into a major component at the desired 0° and a small component at 90°. The effect on isolation is illustrated in FIG. 1d. It is the same as FIG. 1c, except that components due to an imperfect rotator/half-wave plate combination has been taken into account. Since these are considered in combination, section C—C' between the two has been omitted. The main components are indicated by a line extending through the ray circles. A, usually much smaller, spurious component is indicated by a line terminating at the ray circle and a spurious component of a spurious component is indicated by a line that does not reach the ray circle.

As shown (D'), after traversing the rotator/half-wave plate combination, both rays 36 and 37 have spurious components at 90° to the desired polarization directions. As a result, after traversing the plate 72, the spurious component of ray 36 is deflected a distance d to meet the spurious component of ray 37 to form ray 51 (E'). On reflection, this emerges from the GRIN lens 8 as ray 52. After traversing the plate 71, one polarization of ray 52 is deflected by d to form ray 52b and ray 52a is formed from the undeflected part. Again, after traversing the combination of half-wave plate 61 and rotator 5, rays 52a and 52b have picked up spurious components. The spurious component of ray 52d is not deflected by the plate 41 and the spurious component of ray 52c is deflected. Both end up hitting the input fiber 1. It is important to note however, that both or these components are spurious component of spurious components. In other words, they are a small fraction of a small fraction of the main beam. The spurious component 52g is shifted by d and misses the input fiber while spurious component 52e is not shifted. Thus, two stages of isolation is provided for all polarizations. If the first stage is perfect, then beam 51 will not be formed and no rays will intercept the fiber.

Even if the first stage is perfect, as shown, ray 42b has a spurious component that is not deflected and becomes ray 42c while ray 41b has a spurious component that is deflected as ray 41d. Even if the first stage is perfect, these spurious components will exist unless the second stage is perfect. As with the rays 52g and 52e, this puts them at a distance d from the input fiber instead of √2d. This is not as desirable, but they are usually a small fraction of the main beam. Even if the rotator/half-wave plate combination is perfect, the birefringent plate 41 may be misoriented. This will introduce spurious components into rays 41b and 42b. The result will be similar to that illustrated for rays 41c & 41d and 42c & 42d, except that the rays will be slightly displaced in location.

Working Examples:

Several prototypes of the embodiment, as illustrated in FIG. 1a, for operation at 1.55 μm were constructed. The birefringent plates 41, 42, 71, and 72 were 0.5 mm thick $YVO_4$. Based on an $n_e-n_o=0.2$ at 1.55 μm (see the supplier's data sheet in "Crystals & Materials, Laser Accessories," from Crystal Guide 1996, p. 51, CASIX, Inc. Monrovia, Calif.), this should produce a walk-off distance of 50 μm. The half-wave plates 61 and 62 were quartz, 0.28 mm thick. Plate 5 was a "Latching" Faraday rotator from Lucent Technologies, Murray Hill, N.J. The GRIN lens 8 was a 3 mm diameter Model SLW 300-025-156 from Nippon Sheet Glass Co., Ltd., sold under the trademark SELFOC. This is nominally a quarter pitch, 7.89 mm long, and to compensate for the extra optical path length in the other elements, 1.6 mm was cut off. The mirror 9 was a partially transmitting evaporated gold coating. The elements were held together with an adhesive outside the beam transmission area so that it did not interfere with beam transmission. The plates were held in close proximity but with an air gap. All surfaces of the optical elements, were anti-reflection coated for air.

The fibers 1 and 2 were uncoated single mode model SWF-29 from Corning, Inc., Corning, N.Y., with a core diameter of 10 μm and an overall diameter of 125 μm. These were cut at an 8° angle to reduce reflections. Unfortunately, the anti-reflection coating supplier had difficulty making a good coating on the angled surfaces. These were mounted in block 3 in V-grooves etched in a silicon slab at a distance of 1.3 mm. Initially, it was thought that 400 μm would be a more optimum distance, because this puts the beams closer to the axis of the GRIN lens where it is more ideal. However, larger separations seem to work better, even though the isolated beams are the same distance from the input fiber. The block 3 was aligned with the rest of the assembly by maximizing the transmission from fiber 1 to fiber 2 in the forward transmission direction. Use of the just described block with both fibers on the same side so that their separation was fixed, made this easy using an X—Y—Z micrometer stage. Commonly, alignment of such fiber-optic components is not to a particular predetermined position, but to whatever position yields the best result. In this case, the fact that the fibers are displaced by half the walk-off distance (25 μm) from the GRIN lens central axis wasn't discovered until drawings were made to explain how this embodiment works, in particular, why it performed well with less than ideal optical components.

A table of results follows.

TABLE 1

| No. | Insertion Loss (dB) | Isolation (dB) | Polarization Dependent Loss (dB) | Tap Ratio (%) |
|---|---|---|---|---|
| 1 | 1.11 | 55 | 0.05 | 5.0 |
| 2 | 0.92 | 63 | 0.04 | 4.5 |
| 3 | 1.03 | 54 | 0.1 | 4.6 |
| 4 | 1.00 | 57 | 0.1 | 3.1 |
| 5 | 0.90 | 55 | 0.06 | 3.0 |

The polarization dependent loss is the difference in loss for two orthogonal polarizations inserted as test signals. The tap ratio is the amount of light transmitted through the mirror coating 9.

It is difficult to say these are surprising results without examples to compare them to. U.S. Pat. No. 5,033,830, issued Jul. 23, 1991 to Jameson, discloses a single-sided, single-stage isolator having a peak isolation of 41 dB and a loss of less than 2 dB. Although the loss is higher, the isolation is quite good for a single-stage isolator. However, it should be noted that the working examples presented here were prototypes and could be improved. A good anti-reflection coating is believed would reduce the insertion loss by about 0.4 dB. Also, a 5% tap produces a loss in transmission front fiber 1 to fiber 2 of 0.2 dB. Lastly, the prototypes were not made in a clean room. Sub-micron particles could cause scattering within the isolator to the input fiber. Even so, the 54 to 63 dB isolation is already satisfactory for most applications.

Figure 2A:
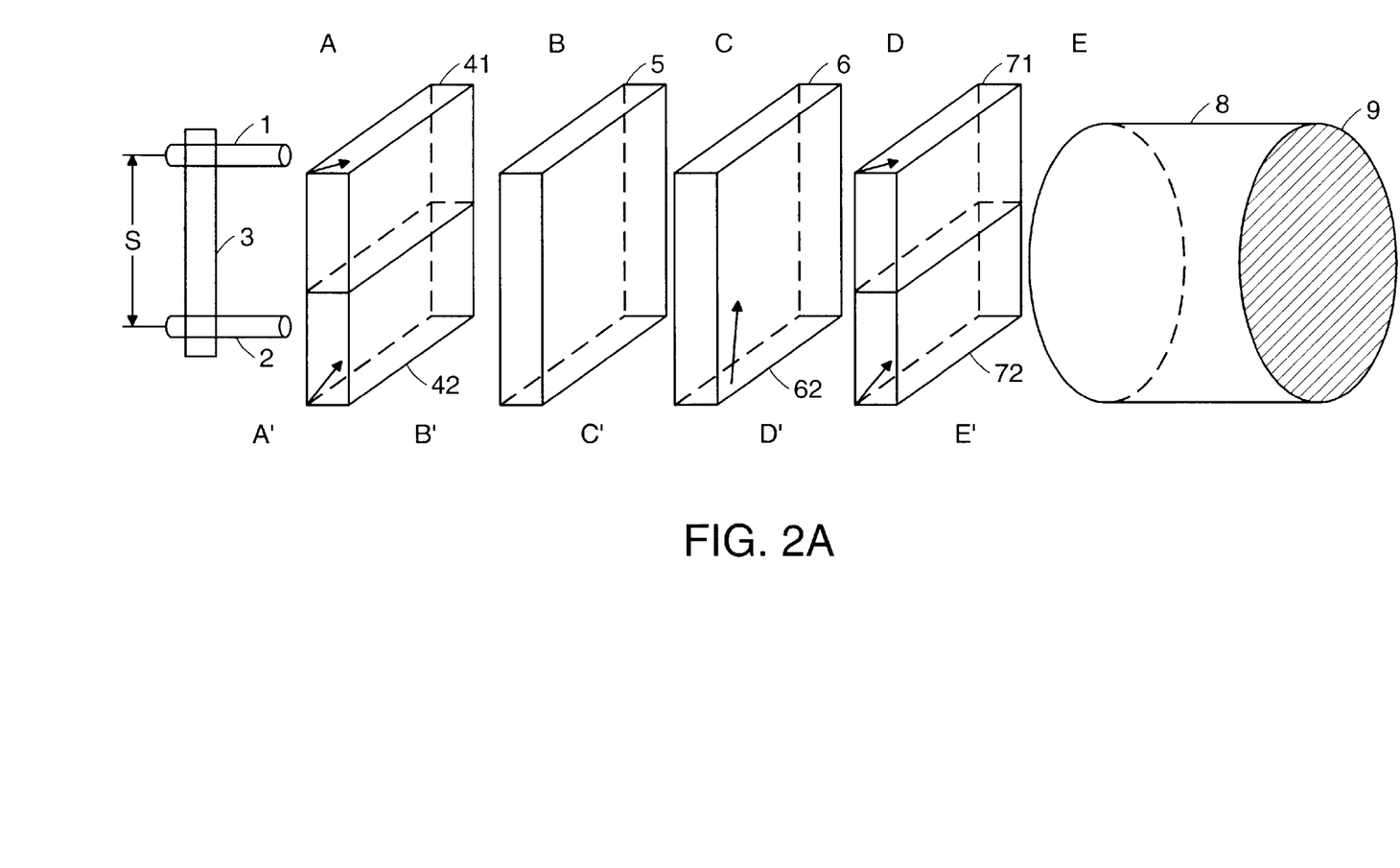
FIG. 2a is a perspective view of a second embodiment of an optical isolator according to the present invention. The light from a first fiber is transmitted to a second fiber in a forward direction.

Another embodiment of the invention is illustrated in FIG. 2a. This is similar to the first embodiment shown in FIG. 1a in that it provides ray deflections in two dimensions. It is a little simpler in that the half-wave plates, instead of being split are combined into a single half-wave plate 6 with a single orientation in the transverse plane at 22.5° from the fiber plane. Although the birefringent plates 41 and 71 are the same, the plates 42 and 72 have their c-axes oriented differently. Specifically, the plates 41 and 71 have their c-axes at 45° to all three planes, i.e., they lie along a diagonal of an imaginary cube.

Figure 2B:
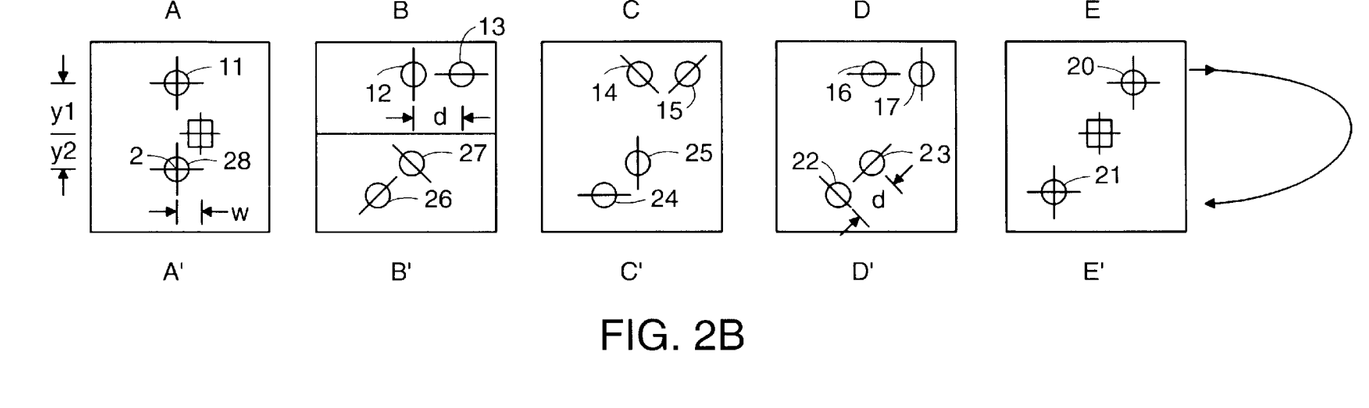

As shown in FIG. 2b, the progression in the forward transmission direction in the first stage is the same as for the embodiment illustrated in FIG. 1b. In the second stage, however, the extraordinary ray 22 is deflected by d at 45° as shown (D'). After the polarizations are interchanged with the result shown in panel B', the rays traverse plate 42 and ray 26 is defected by d to combine with ray 27 and form ray 28 at the output fiber location.

Because of the 45° deflections, the location of the input and output fibers is slightly more complicated. It can be show that, in order for the spacing, w, in the longitudinal plane from the GRIN lens axis to be the same, w=(√2−1) d/2√2. Also, y1=y2+d/√2.

Figure 2C:
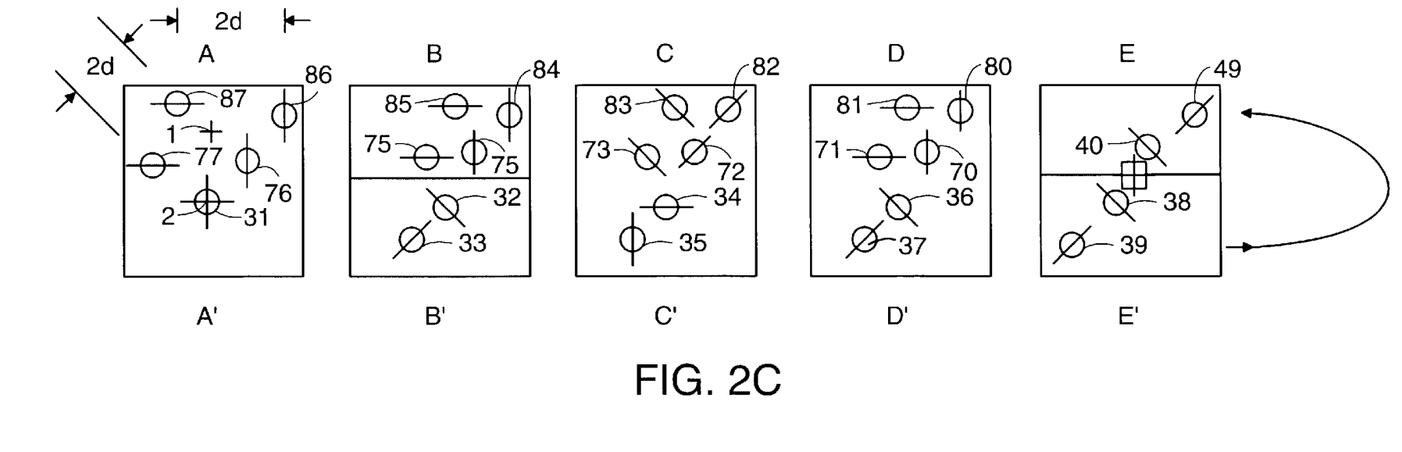
FIG. 2c corresponds to FIG. 2b and illustrates isolation. The light from the second fiber is not transmitted to the first fiber in the backward direction.

FIG. 2c shows the ray locations and polarizations in the backward (isolation) direction. This differs from the results for the first embodiment shown in FIG. 1c because of the 45° deflections. There are now four rays 76, 77, 86, and 87, disposed about the input fiber instead of two. This is because, after the first stage, the ray polarization directions are at 45° to the longitudinal plane. When rays 40 and 41 traverse the plate 72, they are each separated into two polarizations and the extraordinary ones are deflected as shown in panel D. Since traversing the half-wave plate and rotator doesn't change the polarization directions, these extraordinary component are further deflected by the plate 41. Of the four rays, two, 76 and 87 are closer than the other two. However, since d is somewhat arbitrary, the distance can be increased.

Figure 2D:
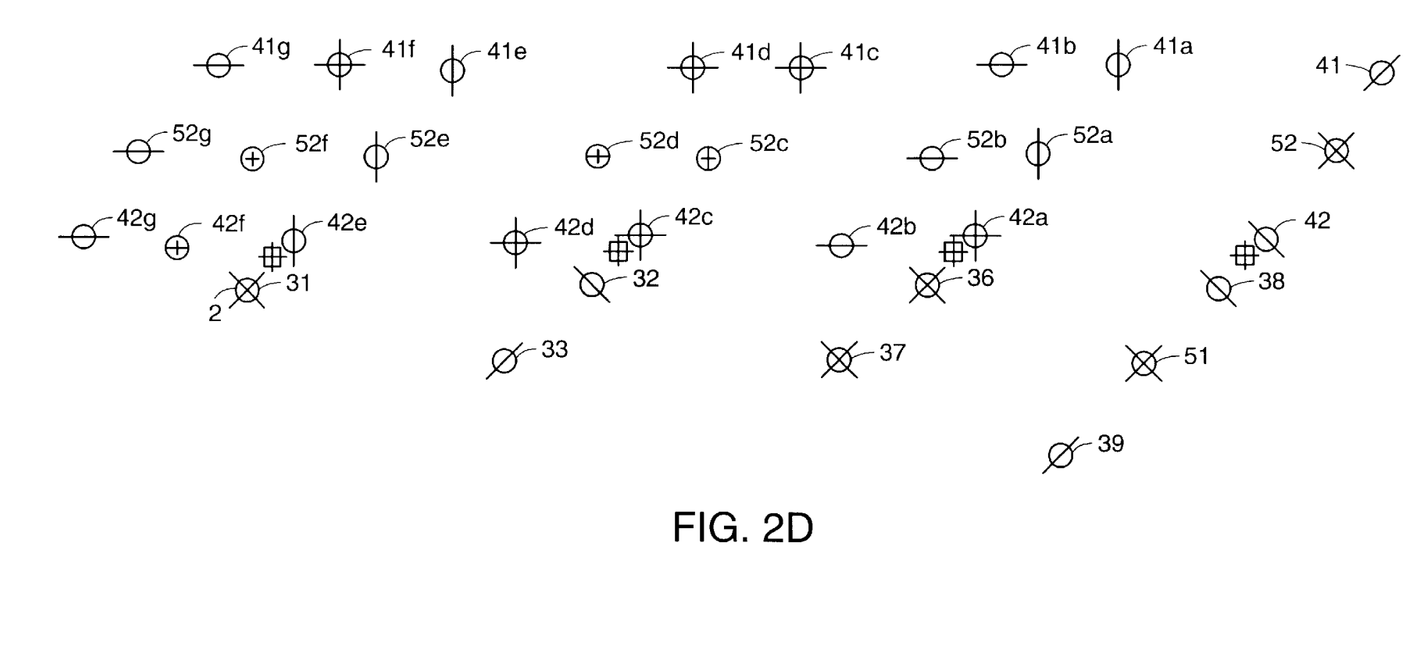
FIG. 2d corresponds to FIG. 2c and shows the end views of polarization directions corresponding to optical rays, excluding section C—C' of FIG. 2c, but including spurious rays due to imperfect optical components.

As with the first embodiment, this embodiment also provides two stages of isolation as illustrated in FIG. 2d. Here there are eight ray locations clustered about the input fiber and one on the input fiber. As with the first embodiment, the components that reach the input fiber, ray 52f are a fraction of a fraction of the main beam. As with the first embodiment, if there are imperfections in the last birefringent plate 41, the only components that can reach the input fiber are spurious components of spurious components.

In summary, it is believed that deflection in two dimensions provides improved tolerance of optical element imperfections compared to prior art single-sided optical isolators.

The specification is not limited to the embodiments diselosed herein as these are only examples. Other obvious alternatives, modifications, or equivalents will be apparent to those skilled in the iosolator art. In particular, in the claims, one example of a polarization sensitive deflector is a birefringent plate. An example of a polarization interchanger is a combination of a Faraday rotator and a half-wave plate.

What is claimed is:

1. A single-sided, fiber-optic cable input, optical isolator device comprising:
    an input fiber for transmitting an input light beam and an output fiber for receiving a reflection of the input light beam as an output beam, both fibers being on the same side of said device;
    a first polarization sensitive deflector encompassing the input beam and a second polarization sensitive deflector encompassing the output beam, both disposed adjacent the fibers;
    a polarization interchanger disposed adjacent said first and second deflectors functioning to interchange the polarization of beams traveling from the input to the output and leave unchanged the polarization of beams traveling from the output to the input;
    a third polarization sensitive deflector encompassing the input beam and a fourth polarization sensitive deflector encompassing the output beam, both disposed adjacent said interchanger opposite said first and second deflectors;
    a lens having a reflector on the side opposite the input and output fibers disposed adjacent said third and fourth deflectors,
    wherein said first and third deflectors produce deflections in a first selected direction in a plane transverse to the direction of travel of the light beams and said second and fourth deflectors produce deflections in the transverse plane at an angle of at least about 45° to said first direction,
    whereby backward transmission of light from the output fiber to to the input fiber due to imperfections in optical components is minimized.

2. The optical isolator of claim 1 wherein said input and output beams are physically displaced from the central axis of said lens in a plane perpendicular to the plane containing said beams by an amount selected to maximize isolation.

3. The optical isolator of claim 1 wherein said lens is a quarter-pitch GRIN lens whose optical path length is shortened by an amount approximately equivalent to the combined optical path length in one direction of said deflectors and said interchanger.

4. The optical isolator of claim 3 wherein said input and output beams are physically displaced from the central axis of said lens in a plane perpendicular to the plane containing said beams by an amount selected to maximize isolation.

5. The optical isolator of claim 3 wherein said input and output fibers are mounted in V-grooves in a silicon block having a spacing between grooves greater than about 400 μm.

6. The optical isolator of claim 1 wherein said reflector transmits a selected portion of the input beam so that the input beam can be monitored.

7. The optical isolator of claim 1 wherein said first and third deflectors produce deflections in a plane substantially perpendicular to a plane containing the input and output beams and said second and fourth deflectors produce deflections in a plane substantially parallel to a plane containing the input and output beams.

8. The optical isolator of claim 7 wherein said input and output beams are physically displaced from the central axis of said lens in a plane perpendicular to the plane containing said beams by amount approximately equal to d/2 where d is the deflection distance of said deflectors so that isolation is maximized.

9. The optical isolator of claim 7 wherein said lens is a quarter-pitch GRIN lens whose optical path length is shortened by an amount approximately equivalent to the combined optical path length in one direction of said deflectors and said interchanger.

10. The optical isolator of claim 9 wherein said input and output beams are physically displaced from the central axis of said lens in a plane perpendicular to the plane containing said beams by an amount approximately equal to d where d is the deflection distance of said deflectors, so that isolation is maximized.

11. The optical isolator of claim 9 wherein said input and output fibers are mounted in V-grooves in a silicon block having a spacing between grooves greater than about 400 μm.

12. The optical isolator of claim 7 wherein said reflector transmits a selected portion of the input beam so that the input beam can be monitored.

13. The optical isolator of claim 1 wherein said first and third deflectors produce deflections in a plane substantially perpendicular to a plane containing the input and output beams and said second and fourth deflectors produce deflections in a plane substantially at 45° to a plane containing the input and output beams.

14. The optical isolator of claim 13 wherein said input and output beams are physically displaced from the central axis of said lens in a plane perpendicular to the plane containing said beams by an amount approximately equal to (√2−1)d/

$2\sqrt{2}$ where d is the deflection distance of said deflectors, so that isolation is maximized.

15. The optical isolator of claim 13 wherein said lens is a quarter-pitch GRIN lens whose optical path length is shortened by an amount approximately equivalent to the combined optical path length in one direction of said deflectors and said interchanger.

16. The optical isolator of claim 15 wherein said input and output beams are physically displaced from the central axis of said lens in a plane perpendicular to the plane containing said beams by an amount approximately equal to $(\sqrt{2}-1)d/2\sqrt{2}$ where d is the deflection distance of said deflectors, so that isolation is maximized.

17. The optical isolator of claim 15 wherein said input and output fibers are mounted in V-grooves in a silicon block having a spacing between grooves greater than about 400 μm.

18. The optical isolator of claim 13 wherein said reflector transmits a selected portion of the input beam so that the input beam can be monitored.

* * * * *